Oct. 3, 1961 S. P. TSCHAPPAT 3,002,776
MOLDED PACKING GLAND
Filed July 11, 1957
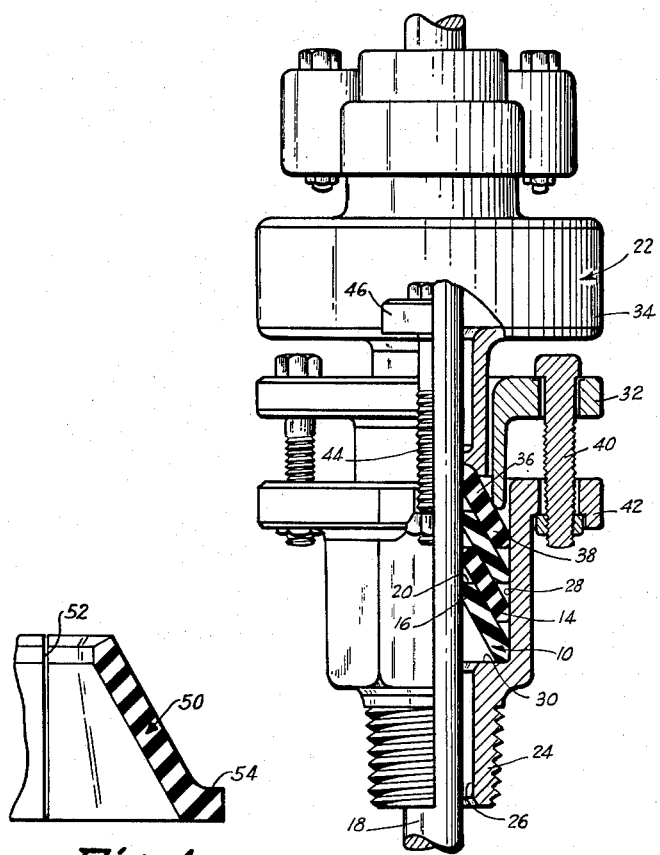
Fig. 1
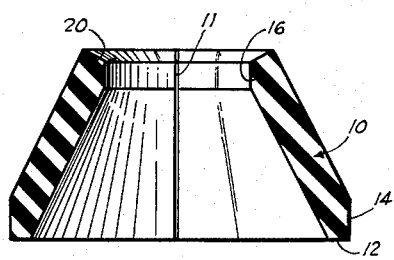
Fig. 2
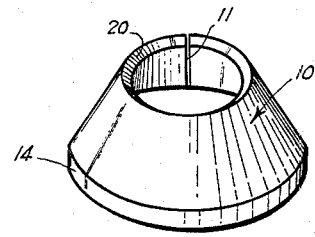
Fig. 3
Fig. 4
INVENTOR.
Sheridan P. Tschappat
BY
ATTORNEY S. M. McKnight

United States Patent Office 3,002,776
Patented Oct. 3, 1961

3,002,776
MOLDED PACKING GLAND
Sheridan P. Tschappat, 1201 W. 17th, Tulsa, Okla.
Filed July 11, 1957, Ser. No. 671,280
2 Claims. (Cl. 288—8)

This invention relates to packing glands and more particularly, but not by way of limitation, to a conical shaped packing gland for use with an oil well stuffing box.

Many producing oil wells of today do not have sufficient sub-surface pressure for flowing the fluid from the well by a natural flow process. Thus, many of the wells are produced by means of a reciprocating type bottom hole pump. The pump is usually actuated by a string of sucker rods which extend longitudinally downward in the well bore. The uppermost rod is called a polished rod and usually reciprocates within a stuffing box which is secured to the well head. A plurality of packing gland members are disposed within the stuffing box around the polished rod for providing a seal therebetween and preclude leakage of fluid around the rod. It has been found in actual field conditions that a conical shaped packing ring or gland is usually the most efficient in operation. Many of these packing glands are stamped out or punched from a flat sheet of suitable resilient material. The flat material or piece is then usually placed in the stuffing box around the polished rod in a manner to shape the flat piece into a conical shape. The shaping of the gland into a conical disposition around the polished rod is tedious and time consuming.

Furthermore, a large variety of field conditions are encountered in producing oil wells. Many oil bearing formations contain substantially large quantities of water which is pumped from the well bore along with the oil or gas. This presents a problem in that the lubricating qualities of the well fluid are greatly reduced. As a result, the outer periphery of the polished rod may be worn very rapidly, as well as the packing glands. Many wells producing from other types of subsurface formations may have a tendency to "pump off" or become very dry. Under these conditions serious friction problems may develop between the polished rod and the packing gland whereby the gland member may be burned and seriously damaged. Other wells are very old and have been producing for several years. The polished rod on some of these old wells may be worn and pitted thereby creating a difficult sealing problem around the outer periphery thereof. In addition, some of the polished rods are made of steel, thus the sealing problem is concerned with the properties of steel. On other polished rods, however, brass liners, or the like, have been provided, thereby creating a sealing problem of a different nature than the steel rods.

The present invention contemplates a novel packing gland molded in a conical shape for facilitating the disposition of the packing gland within the stuffing box. Furthermore, the packing members are all constructed from a base stock of a suitable rubber or neoprene. However, the base stock may be varied by the addition of certain suitable or special material in order to meet the particular field conditions required for each individual well. Graphite and paraffin may be added to the base stock in order to overcome certain types of wear and friction problems, whereas friction stock may be added to the base rubber to fulfill other operating conditions. Thus, the novel molded conical packing gland is able to meet the varied requirements found under actual working conditions in the oil and gas producing industry. Furthermore, the novel packing gland is simple in operation and durable in construction.

It is an important object of this invention to provide a packing gland for use with oil well stuffing boxes for precluding the leakage of fluid around the polished rod.

It is another object of this invention to provide a packing gland for oil well stuffing boxes and which is molded in a conical shape during the construction thereof for facilitating the disposition of the gland around the polished rod.

Another object of this invention is to provide a conical shaped packing gland constructed from a base stock material which may be easily and readily altered to meet the variety of field conditions encountered in the oil producing industry.

A further object of this invention is to provide a novel packing gland member which is simple and efficient in operation and economical in construction.

Other objects and advantages of the invention will be evident from the following detailed description, read in conjunction with the accompanying drawings, which illustrate my invention.

In the drawings:

FIGURE 1 is an elevational view, partly in section of a stuffing box having the novel packing glands disposed therein.

FIGURE 2 is a sectional elevational view of a packing gland embodying the invention.

FIGURE 3 is a perspective view of a packing gland embodying the invention.

FIGURE 4 is a partial sectional elevational view of a modified packing gland.

Referring to the drawings in detail, reference character 10 refers in general to a conical shaped packing gland. The gland 10 is molded from a suitable rubber or neoprene material, and is provided with a longitudinal split 11 extending throughout the length thereof for facilitating the installation of the packing gland 10, as will be hereinafter set forth. A substantially flat circumferential shoulder 12 is provided at one end of the gland or packing ring 10. A substantially smooth and straight annular shoulder 14 is provided on the outer periphery of the gland 10 and is preferably conterminous with the circumferential shoulder 12 to provide a perpendicular relationship therebetween, as clearly shown in FIG. 2, and for a purpose as will be hereinafter set forth. The upper portion of the gland 10 is provided with an internal bore portion 16 of substantially the same size as the outer periphery of the polished rod 18 for receiving the rod therein. An inwardly diverging tapered portion 20 is provided at the top of the gland 10 and is in communication with the internal bore 16.

Referring to FIG. 1, a suitable stuffing box 22 is loosely disposed around the polished rod 18 in any well known manner. The stuffing box 22 is provided with a downwardly extending exteriorly threaded neck portion 24 adapted for connection to a well head (not shown) at the surface of an oil well bore. The neck portion 24 is provided with an internal bore 26 for loosely receiving the polished rod 18, as shown in FIG. 1. The bore 26 extends upwardly within the stuffing box 22 and is enlarged at 28 to provide an internal chamber for receiving the packing glands 10. A circumferential shoulder 30 is provided at the lowermost portion of the chamber 28 to receive the flat shoulder 12 of one of the packing glands 10. A plurality of the glands 10 are preferably disposed within the chamber 28 in a superimposed position, as clearly shown in FIG. 1. The conical shape of the packing glands 10 facilitates the stacking of the packings within the box 22 and provides an efficient seal between the rod 18 and the box 22, as will be hereinafter set forth.

The stuffing box 22 is preferably provided with an outer tubular follower member 32 and an inner tubular follower member 34 for exerting a downward pressure on the glands 10 for effecting an efficient sealing action therefor. The inner follower 34 is adapted to be disposed adjacent the inner end or reduced end portion 36 of the uppermost of the packing ring members 10, thereby forcing the internal bore 16 thereof into a tight sealing relation with the outer periphery of the polished rod 18. In a similar manner, the outer follower member 32 is adapted to be disposed adjacent the outer end or flared portion 38 of the uppermost packing ring 10, thereby forcing the annular shoulder 14 thereof into an efficient sealing relation with the inner periphery of the chamber 28. In this manner, an efficient sealing is provided between the polished rod and the stuffing box 22 to preclude leakage of well fluid therebetween.

Operation

The packing glands 10 may be disposed within the chamber 28 of the stuffing box 22 in a stacked relation and around the polished rod 18 in any well known manner. It will be apparent that the longitudinal split 11 permits the disposition of the packing gland 10 around the polished rod 18 in a transverse or lateral direction, thereby greatly facilitating the replacement of worn packing members. The outer follower member 32 may be disposed adjacent the outer or flared end 38 of the uppermost of the packing glands 10 and may be urged downwardly thereagainst in any suitable manner, such as the threaded stub member 40 and cooperating flange member 42 provided on the stuffing box 22. In a similar manner, the inner follower member 34 may be disposed adjacent the inner end 36 of the uppermost packing gland 10 and urged downwardly thereagainst in any suitable manner, such as by the threaded stud member 44 and cooperating flange member 46 provided on the stuffing box.

It will be apparent that downwardly pressure of the followers is transmitted to each of the succeeding packing glands disposed within the stuffing box 22. The downward pressure of the inner follower member 34 assures a tight seal between the outer periphery of the polished rod 18 and the internal bore 16 of the packing glands 10. Furthermore, the recessed portion 20 tends to accumulate lubricant which is wiped from the periphery of the polished rod, thereby providing an additional lubrication for the rod during the reciprocation thereof. The downward pressure of the outer follower member 32 assures a tight seal between the inner periphery of the chamber 28 and the annular wall portion 14 of the packing glands 10, thereby precluding any leakage of fluid therebetween.

As hereinbefore set forth, the packing members 10 are constructed from a base stock material of suitable rubber or neoprene. However, in order to meet varied working conditions which are encountered in the field in the oil producing industry, the base stock is so designed in order that certain additives may be readily and easily combined therewith during the molding of the packing glands. For example, under working conditions wherein the well has a tendency to pump off or become dry, it is preferable to add suitable quantities of graphite and paraffin to the base stock material. The paraffin and graphite content will provide for lubrication for the pumping parts and greatly reduce the wear on the outer periphery of the polished rod. This type of composition is also considered desirable for use on a well wherein brass liners are utilized.

In other types of field conditions, such as when excess or great quantities of water are present in the oil being produced, the lubricating qualities of the fluid is lessened. In such an instance, it is preferable to add friction stock and graphite to the base stock material. The friction stock is preferably any material that will withstand the friction of the polished rod rubbing thereagainst, or material which will withstand abrasion. Although the water in the fluid does provide some lubricant, the graphite in the composition prevents wear of the steel material of the polished rod.

When the glands are to be utilized on a well having an old polished rod which is pitted and worn on its outer periphery, it is preferable to add flaked lead to the base stock material. The flaked lead in the gland will tend to smooth up the rod upon reciprocation thereof, and thereby lengthen the life of both the rod and packing member. It is sometimes desirable to add the flaked lead in different quantities to the base stock material when the gland is to be utilized with brass liners instead of steel polished rods.

Referring to FIG. 4, a modified packing gland 50 is depicted. The gland 50 is of a substantially conical configuration, similar to the gland 10, and is provided with a longitudinal slit 52 throughout the length thereof for facilitating disposition thereof around the polished rod 18, as hereinbefore set forth. The lower or outwardly flared edge of the gland 50 is provided with an outwardly extending circumferential flange portion 54. When a plurality of the glands 50 are disposed within the stuffing box 22 in a stacked arrangement, as set forth in the preferred embodiment, the outer periphery of the flange 54 seats against the inner periphery of the chamber 28 for assuring an efficient sealing therebetween.

From the foregoing, it will be apparent that the present invention provides a novel packing gland molded in a conical shape for facilitating the disposition of the packing member around the polished rod of an oil well stuffing box. The novel packing ring is constructed of a base stock of rubber or neoprene which may be readily altered by the addition of suitable materials for fulfilling the requirement of a variety of different types of operating conditions found in the oil producing industry. The novel packing gland is simple and efficient in operation and economical and durable in construction.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. A unitary molded packing gland adapted to be interposed between a polished rod and a fixed housing and constructed from a solid resilient rubber having additives of graphite, paraffin, and friction resistant material included therein for increasing the lubricating and wearing properties of the packing gland.

2. A unitary molded packing gland for an oil well having a polished rod provided therein, said packing gland constructed from a solid resilient base stock of rubber material having additives of friction resistant material and graphite interspersed throughout for providing lubrication to the rod and reducing wear on the packing gland.

References Cited in the file of this patent

UNITED STATES PATENTS

| | | |
|---|---|---|
| 206,548 | Edmonds | July 30, 1878 |
| 1,998,892 | Braden | Apr. 23, 1935 |
| 2,056,687 | Moseley | Oct. 6, 1936 |
| 2,062,518 | Lindbloom | Dec. 1, 1936 |
| 2,145,884 | Leman | Feb. 7, 1939 |
| 2,564,912 | McKissick | Aug. 21, 1951 |
| 2,697,623 | Mosher | Dec. 21, 1954 |

FOREIGN PATENTS

| | | |
|---|---|---|
| 633,021 | Great Britain | of 1941 |